United States Patent
Kung et al.

(10) Patent No.: US 8,355,081 B2
(45) Date of Patent: Jan. 15, 2013

(54) DIGITAL DISPLAY CONTROL DEVICE AND METHOD THEREOF

(75) Inventors: Wen-Hsia Kung, Tao Yuan County (TW); Yu-Pin Chou, Miao Li County (TW); Yi-Teng Chen, Kao Hsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 1297 days.

(21) Appl. No.: 12/055,649

(22) Filed: Mar. 26, 2008

(65) Prior Publication Data

US 2008/0239147 A1 Oct. 2, 2008

(30) Foreign Application Priority Data

Mar. 26, 2007 (TW) .............................. 96110393 A

(51) Int. Cl.
*H03L 7/00* (2006.01)
*H04N 9/475* (2006.01)
*G06F 3/038* (2006.01)

(52) U.S. Cl. .................... 348/536; 348/516; 345/213
(58) Field of Classification Search .................. None
See application file for complete search history.

(56) References Cited

U.S. PATENT DOCUMENTS

| | | | | |
|---|---|---|---|---|
| 5,914,757 A | * | 6/1999 | Dean et al. | 348/584 |
| 6,952,125 B2 | * | 10/2005 | Ahn et al. | 327/156 |
| RE39,898 E | * | 10/2007 | Nally et al. | 345/546 |
| 2002/0196366 A1 | * | 12/2002 | Cahill, III | 348/537 |

* cited by examiner

*Primary Examiner* — Kristine Kincaid
*Assistant Examiner* — James Marandi
(74) *Attorney, Agent, or Firm* — Muncy, Geissler, Olds & Lowe, PLLC

(57) ABSTRACT

The invention discloses a display control device and method thereof. The display control device and method thereof utilize the phase deviation and the frequency deviation between the output signal and the input signal caused during channel switching to provide converting time acceptable by a display device and to achieve the objective of balancing the data stream transmission.

17 Claims, 5 Drawing Sheets

DIGITAL DISPLAY CONTROL DEVICE AND METHOD THEREOF

BACKGROUND OF THE INVENTION (a) Field of the Invention

The invention relates to a digital display device, particularly to a digital television display device.

(b) Description of the Related Art

In modern life, display control technology has become indispensable for daily life. Accompanying with the technology improvement and the opening of media, the channel that can be received by the display device (such as: the television) is also becoming more various.

Currently, there are basically two types of digital display control technologies. The first type is the frame rate conversion, that is, the data of at least one frame is buffered by the frame buffer and is displayed after processing. Therefore, the timing control of the output image signal is completely irrelevant to the input image signal. However, the chip area increases due to the large storage capacity of the frame buffer and thereby the cost increases. The second type is the frame synchronization, that is, the data of less than one frame is buffered by the line buffer and is displayed after processing. Since the buffered image data is less than one frame, the frame rates of the input frame and the output frame must be maintained at a specific relation in order to avoid the line buffer overflow or underflow. Therefore, the output image signal timing has specific relations with the input image signal timing. In order to establish the specific relation between the output image signal and the input image signal frame rate, a display vertical synchronization (DVS) signal is generally initiated according to an input vertical synchronization (IVS) signal. The method according to the prior art resets the DVS signal and then outputs the DVS signal according to the IVS signal.

During channel switching, since the video signal timing of the two channels are irrelevant with each other, the frequencies and the phases of the IVS signals of the two channels are most likely not the same. Please refer to FIG. 1, where the IVS signal of the channel 1 is not synchronizing with the IVS signal of the channel 2. However, the frame synchronization technology resets the DVS signal according to the IVS signal. The channel switching may result in such DVS signal timing shown in FIG. 1. Since the DVS signal format (that is, the frame timing) resulting from Such phenomenon cannot meet the required timing of the panel, the panel cannot display normally.

Therefore, an invention for solving the above-mentioned problems is needed urgently.

BRIEF SUMMARY OF THE INVENTION

One object of the invention is to provide a display control device and method thereof to solve the above-mentioned problem.

One object of the invention is to provide a display control device and method thereof to fulfill the trend that the television signal source technology of the future becomes more diversified.

The display control device according to one embodiment of the invention comprises a first measuring circuit, a second measuring circuit, a determining circuit, a timing controller, and a clock generator. The display control device utilizes the phase deviation and the frequency deviation between the output signal and the input signal caused by channel switching to provide converting time acceptable by a display device and to achieve the objective of balancing the data stream transmission.

By the above-mentioned description, the image can be smoothly switched during channel switching no matter what kind of frequency and phase period are used by the channel. In other words, the above-mentioned problem is greatly improved by the present invention and therefore the present invention is a novel invention.

DETAILED DESCRIPTION OF THE INVENTION

Although the present invention has been fully described by way of examples with reference to the accompanying drawings, it Should not be construed as any limitation on the range of implementation of the invention. It should be understood by those who are skilled in the art that hardware manufacturers may use different names for the same element. Thus, in this application and the following claims, the elements are distinguished by their functionalities but not what is called.

Figure 1:
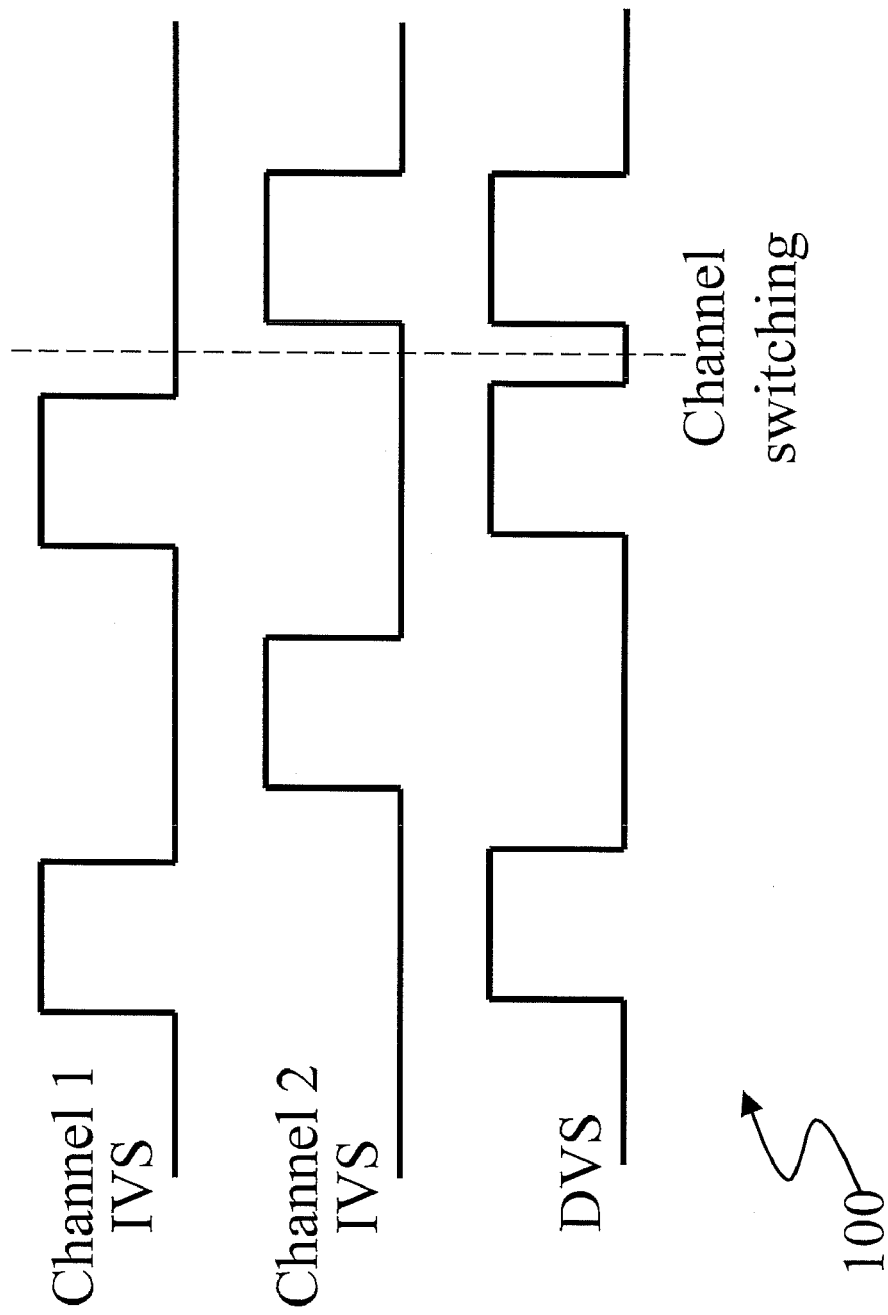
FIG. 1 shows a signal synchronizing timing chart during channel switching in the prior art.
Figure 2:
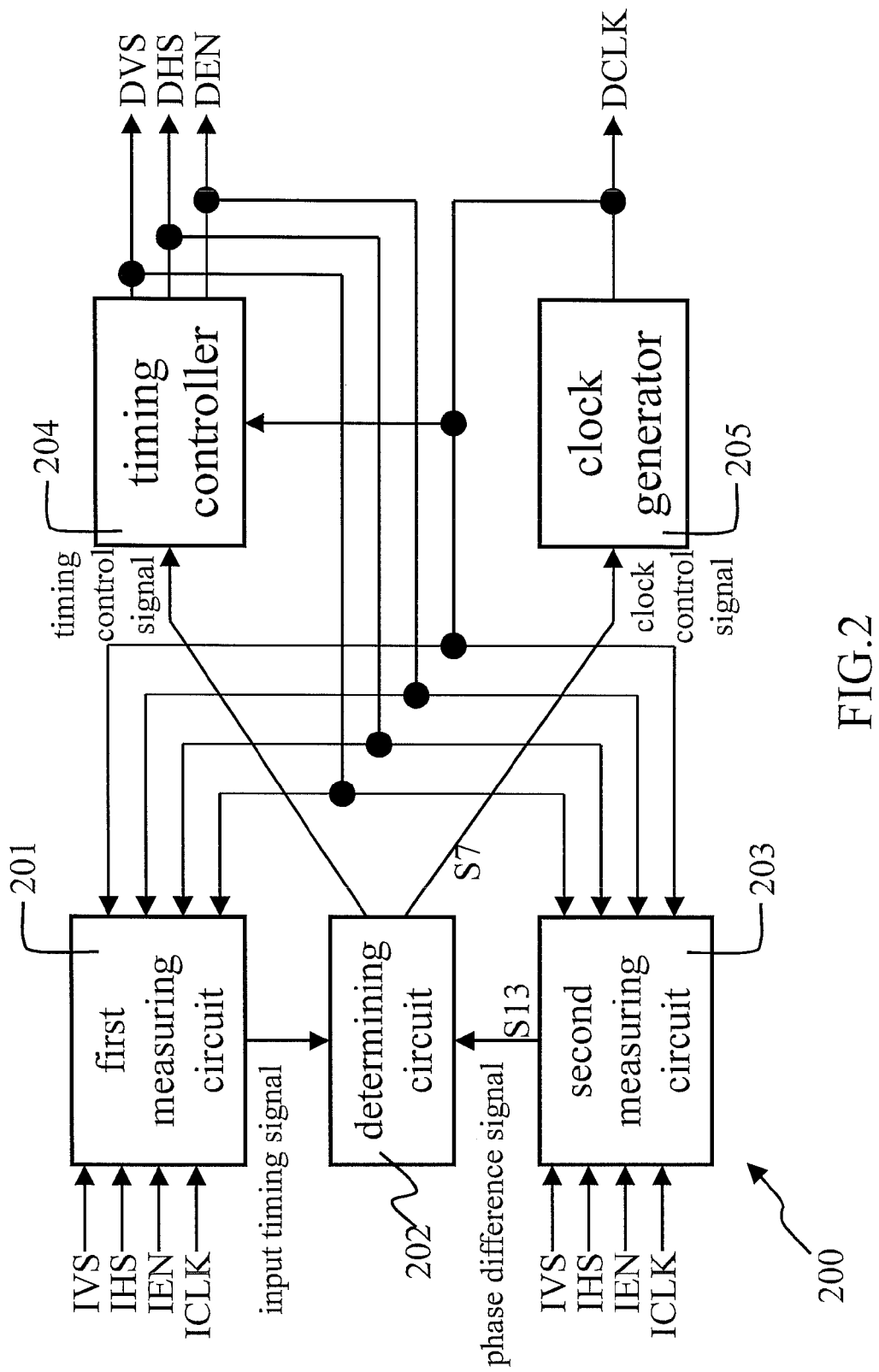
FIG. 2 shows a block diagram of the display control device according to one embodiment of the present invention.

FIG. 2 shows a block diagram of the display control device according to the present invention. As shown in FIG. 2, the display control device 200 comprises a first measuring circuit 201, a determining circuit 202, a second measuring circuit 203, a timing controller 204, and a clock generator 205.

The first measuring circuit 201 detects the frequency of an IVS signal. The second measuring unit 203 detects the phase difference between a DVS signal and the IVS signal. The determining circuit 202 generates a first control signal and a second control signal according to the IVS frequency data and the phase difference data between the IVS and the DVS. The first control signal indicates the setting of the display clock and the second control signal indicates the setting of the display timing. The determining circuit 202 can be implemented by a look up table (LUT) or a logic circuit generated from hardware. The clock generator 205 generates a proper display clock (DCLK) signal according to the setting of the first control signal. Usually, the clock generator 205 can be implemented by a phase-locked loop. The timing controller 204 receives the second control signal (usually comprising: the number of horizontal lines, the number of pixels of the horizontal line, and the reset signal) and the DCLK signal to generate the DVS signal, the display horizontal synchronization (DHS) signal, and the display enable (DEN) signal. Usually, the timing controller 204 can be implemented by a pixel counter and a line counter. The pixel counter counts the number of pixels of the horizontal line according to the DCLK signal and outputs the DHS signal when the count of the pixel counter reaches the number of pixel of the horizontal line. The line counter counts the number of horizontal lines according to the DHS signal and outputs the DVS signal when the count of the line counter reaches the number of horizontal lines of the display frame.

In another embodiment, the first measuring circuit 201 can also measure the frequency data of an input horizontal synchronization (IHS) signal and an input enable (IEN) signal so that the determining circuit 202 can generate more precise control signals. Similarly, the second measuring circuit 203 can also measure the phase difference data of the IHS/DHS and the IEN/DEN so that the determining circuit 202 can generate more precise control signals.

In another embodiment, the first measuring circuit 201 can also measure the frequency data of the IVS, IHS, IEN, DVS, DHS, and DEN so that the determining circuit 202 can generate more precise control signals.

Since the vertical synchronizing signal is related to the horizontal synchronizing signal, the first measuring circuit 201 can only measure the frequency data of the IHS to replace the frequency data of the IVS; and the second measuring circuit 203 can only measures the phase difference between the IHS and the DHS to replace the phase difference between the IVS and the DVS.

Figure 3:
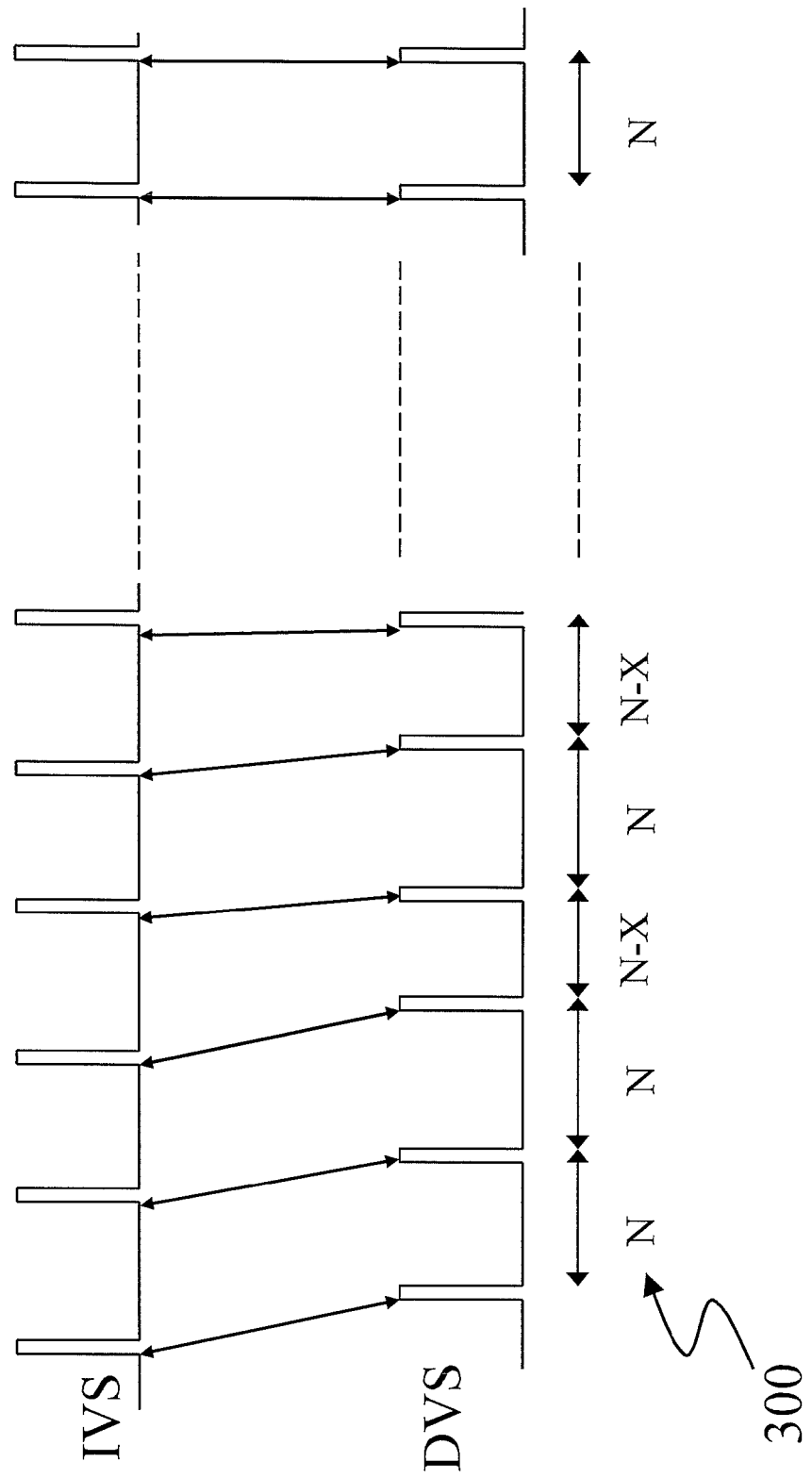
FIG. 3 shows a timing chart illustrating the phase compensation of the display control device and method according to one embodiment of the present invention.

FIG. 3 illustrates the timing diagram of the display control device after channel switching according to one embodiment of the present invention. Initially, the second measuring unit 203 measures the phase difference between the IVS and the DVS to provide the measurement result to the determining circuit 202. Based on the phase difference between the IVS and the DVS, the determining circuit 202 determines and sets the corrections (such as line number, pixel number, clock frequency and so forth) of the display clock and the display timing. By performing adjustment and compensation of a phase correction X repeatedly, the phase deviation between the IVS of the input terminal and the DVS of the output terminal is gradually adjusted and corrected to be within the range acceptable by the system.

Of course, the related display timing, after correction, still has to meet the requirements of the panel. That is, each of the newly corrected display timing during the correction period also has to meet the requirements of the panel. One of implements is to employ the concept of progressive linear frequency switching for performing the adjustment and correction of the frequency deviation between the signals.

Figure 4:
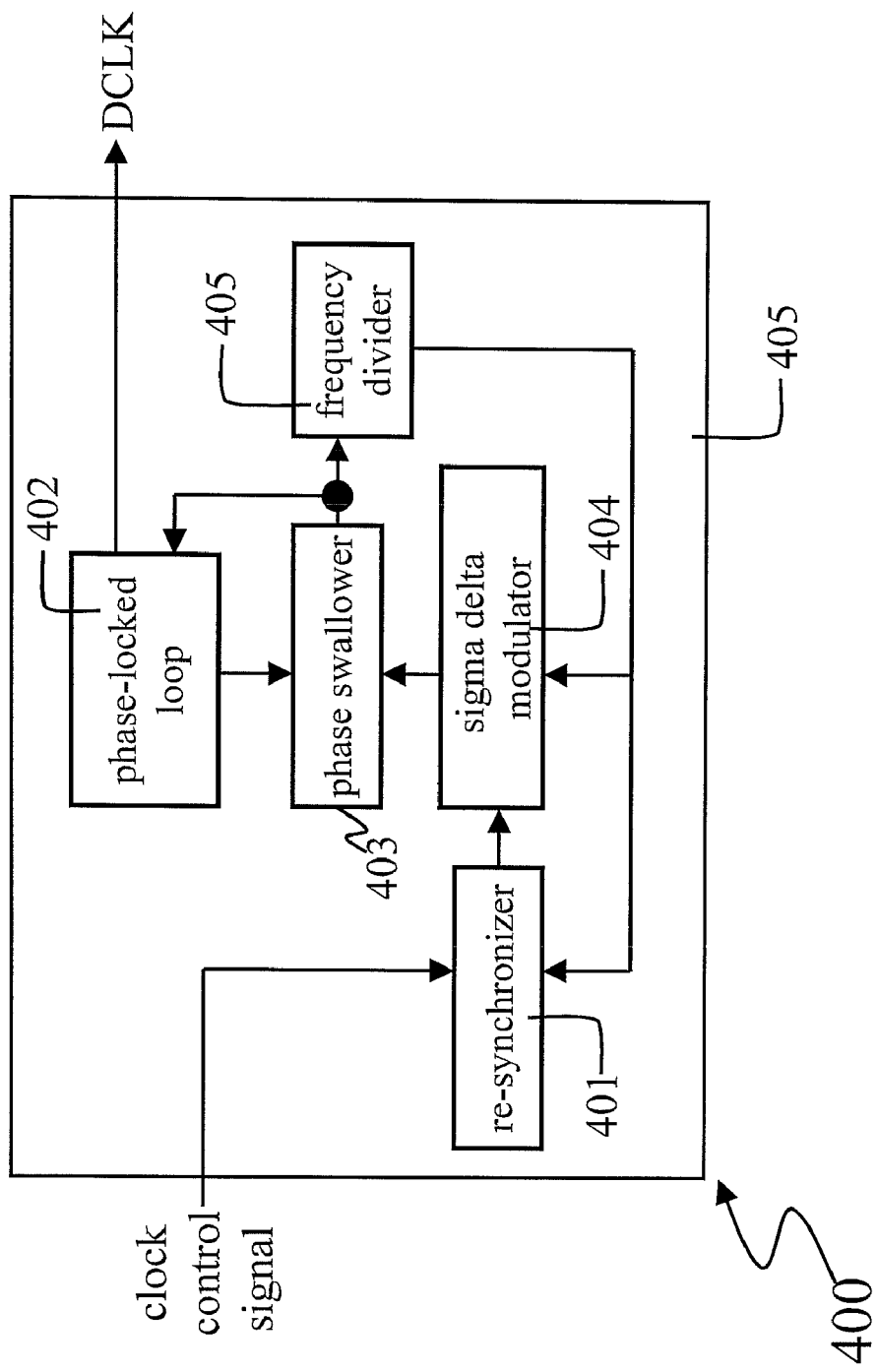
FIG. 4 shows a functional black diagram of the clock generator of the display control device according to one embodiment of the present invention.
Figure 5:
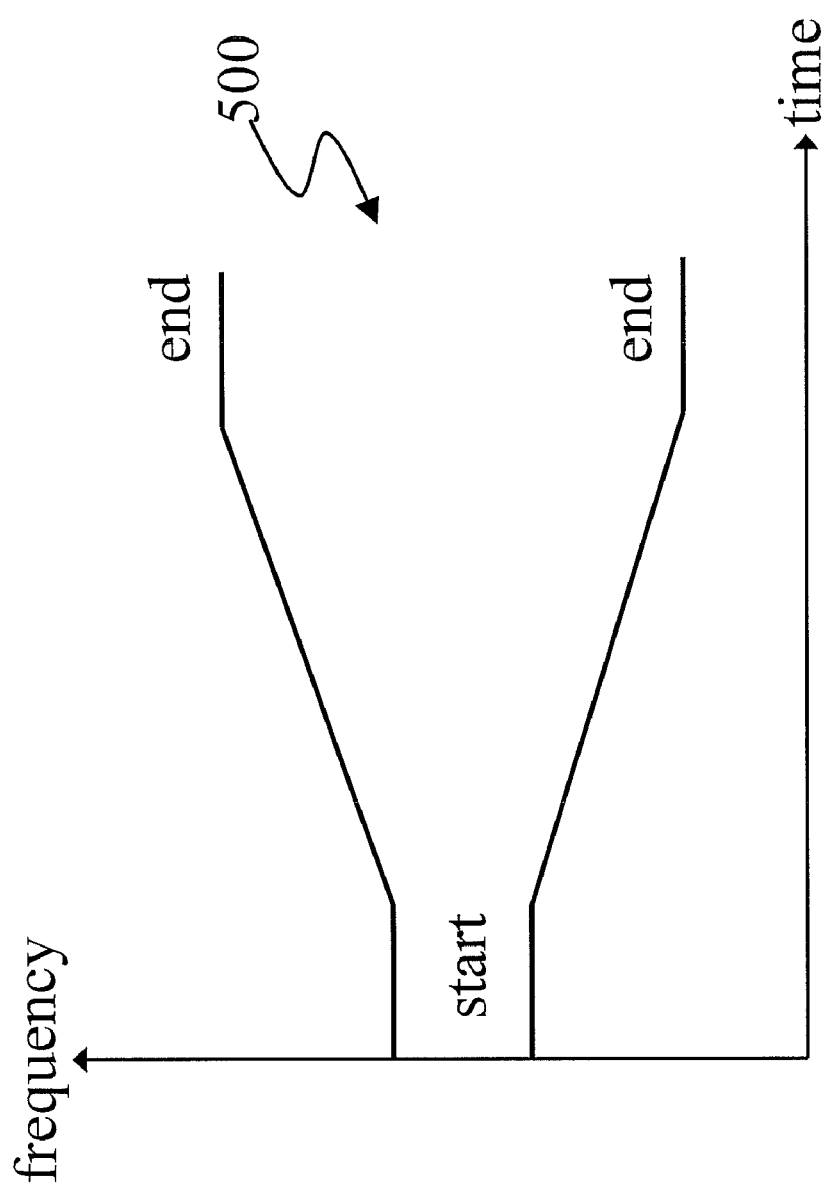
FIG. 5 shows a schematic diagram illustrating the linear frequency switching of the clock generator of the display control device according to one embodiment of the present invention.

Please refer to FIG. 4. FIG. 4 illustrates the block diagram of the clock generator 205 of the display control according to one embodiment of the present invention. The clock generator 205 further comprises a re-synchronizer 401, a phase-locked loop 402 (PLL), a phase swallower 403, a sigma delta modulator 404, and a frequency divider 405. The re-synchronizer 401 can be implemented by a flip-flop and the rest of circuit components are well known to those who are skilled in the art and detail description will be omitted. By utilizing the re-synchronizer 401, the sigma delta modulator 404 and the phase-locked loop with the phase swallow technology, the frequency of the display clock (DCLK) can be increased or decreased, progressively. Therefore, the phase lock loop 402 is controlled by adjusting the level of variation of the first control signal so as to switch frequency progressively and thus the linear frequency switching failure phenomenon induced by the large jitter generated by the drastic frequency switching at the receiving end can be avoided. Therefore, the frame rate can be smoothly switched during the channel switching and this is exactly the concept of linear frequency switching. Please refer to FIG. 5. FIG. 5 shows the frequency variation of the clock generator 205 of the present invention.

The other detail characteristics of the method can be learned from the above-mentioned description by those who are skilled in the art and will not be described in further detail.

Although the present invention has been fully described by way of examples with reference to the accompanying drawings, it should not be construed as any limitation on the implementation of the present invention. Various equivalent changes and modifications of the shape, scope, characteristics, and spirit as described by the claims of the present invention are to be encompassed by the scope of the present invention.

What is claimed is:

1. A display control device, comprising:
 a first measuring circuit, for receiving at least one of a plurality of first timing signals of an input image signal of an input terminal and for detecting at least one frequency of the plurality of first timing signals to output an input timing signal;
 a second measuring circuit, for receiving at least one of the plurality of first timing signals and at least one of a plurality of second timing signals of an output image signal and for detecting the phase difference between at least one of the first timing signals and at least one of the second timing signals to output a phase difference signal;
 a determining circuit coupling to the first and the second measuring circuits, for outputting a timing control signal and a clock control signal according to the input timing signal and the phase difference signal;
 a clock generator coupling to the determining circuit, for outputting an output clock signal according to the clock control signal; and
 a timing controller coupling to the determining circuit, for outputting the plurality of second timing signals according to the timing control signal,
 wherein, based on the phase difference signal, the determining circuit determines and performs adjustment and compensation of phase corrections of the first timing signals of the input terminal and the second timing signals of the output terminal, the clock generator generates an adjusted output clock signal, and the timing controller generates the plurality of second timing signals of an output image signal based on the adjusted output clock signal.

2. The display control device of claim 1, wherein the plurality of second timing signals comprise a display vertical synchronization (DVS) signal, a display horizontal synchronization (DHS) signal, and a display enable (DEN) signal.

3. The display control device of claim 1, wherein the plurality of first timing signals comprise an input vertical synchronization (IVS) signal, an input horizontal synchronization (IHS) signal, and an input enable (IEN) signal.

4. The display control device of claim 1, wherein the first measuring circuit detects at least one frequency of the plurality of second timing signals to output the input timing signal to the determining circuit.

5. The display control device of claim 1, wherein the determining circuit is a look up table (LUT) circuit.

6. The display control device of claim 1, wherein the timing control signal comprises the number of pixels of a horizontal line and the number of horizontal lines.

7. The display control device of claim 1, wherein the timing controller comprises:
 a pixel counter for counting the output clock signal according to the number of pixels of a horizontal line to output a display horizontal synchronization signal; and a line counter coupling to the pixel counter, for counting the display horizontal synchronization signal according to the number of horizontal lines to output a display vertical synchronization signal.

8. The display control device of claim 1, wherein the clock generator comprises a phase-locked loop circuit with phase swallow function.

9. The display control device of claim 1, wherein the clock generator comprises:
- a phase-locked loop for generating a plurality of clock signals with different phases according to a reference clock and a feedback signal wherein one of the plurality of clock signals with different phases is the output clock signal;
- a phase swallower for receiving the plurality of clock signals with different phases, swallowing phases of the plurality of clock signals with different phases according to a modulating signal, and generating the feedback signal; and
- a sigma delta modulator for outputting the modulating signal according to the clock control signal.

10. The display control device of claim 1, wherein the clock generator further comprises:
- a frequency divider for dividing a frequency of the feedback signal to generate a frequency dividing signal; and
- a synchronizer for synchronizing the clock control signal according to the frequency dividing signal.

11. A display control method, comprising:
- receiving an input image signal of an input terminal;
- detecting at least one frequency of a plurality of first timing signals of the input image signal to output an input timing signal;
- detecting the phase difference between at least one of the plurality of first timing signals and at least one of a plurality of second timing signals of an output image signal of an output terminal to output a phase difference signal;
- outputting a timing control signal and a clock control signal according to the input timing signal and the phase difference signal;
- generating an output clock signal of the output image signal according to the clock control signal; and
- generating the plurality of second timing signals of the output image signal according to the timing control signal,
- wherein, based on the phase difference signal, further determining and performing adjustment and compensation of phase corrections of the first timing signals of the input terminal and the second timing signals of the output terminal, generating an adjusted output clock signal, and generating the plurality of second timing signals of an output image signal based on the adjusted output clock signal.

12. The display control method of claim 11, wherein the plurality of second timing signals comprise a display vertical synchronization signal, a display horizontal synchronization signal, and a display enable signal.

13. The display control method of claim 11, wherein the plurality of first timing signals comprise an input vertical synchronization signal, an input horizontal synchronization signal, and an input enable signal.

14. The display control method of claim 11, further comprises:
- detecting at least one frequency of the plurality of second timing signals of the output image signal to output an output timing signal;
- wherein the timing control signal and the clock control signal are outputted according to the input timing signal, the output timing signal, and the phase difference signal.

15. The display control method of claim 11, wherein the timing control signal and the clock control signal are generated by table look-up.

16. The display control method of claim 11, wherein the timing control signal comprises the number of pixels of a horizontal line and the number of horizontal lines.

17. The display control method of claim 16, wherein the step of generating the plurality of timing signals further comprises:
- counting the output clock signal according to the number of pixels of the horizontal line to output a display horizontal synchronization signal; and
- counting the display horizontal synchronization signal according to the number of horizontal lines to output a display vertical synchronization signal.

* * * * *